Sept. 11, 1928.
H. R. TINKER
1,684,160
COMBINATION SPARE TIRE AND ACCESSORY CARRIER
Filed April 22, 1924
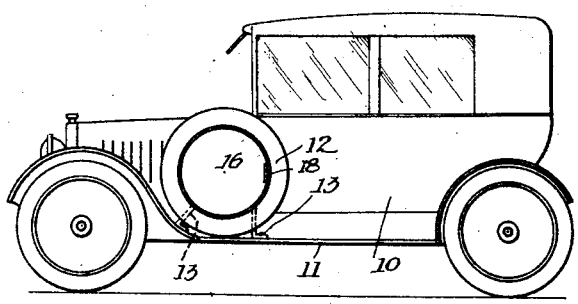
Fig. 1.
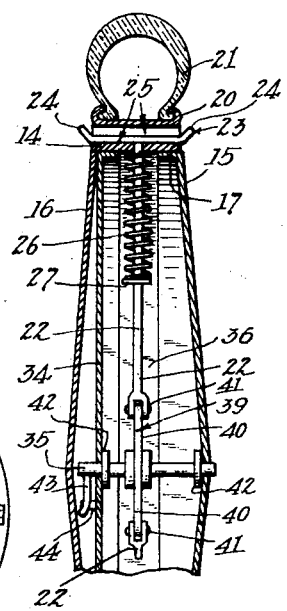
Fig. 4.
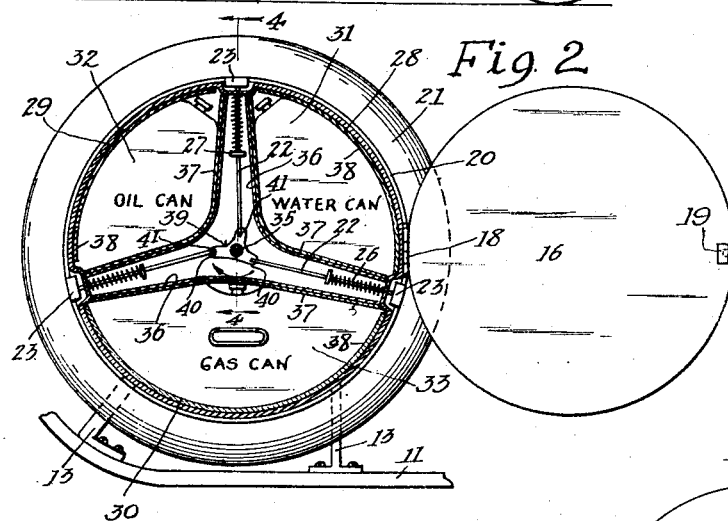
Fig. 2.
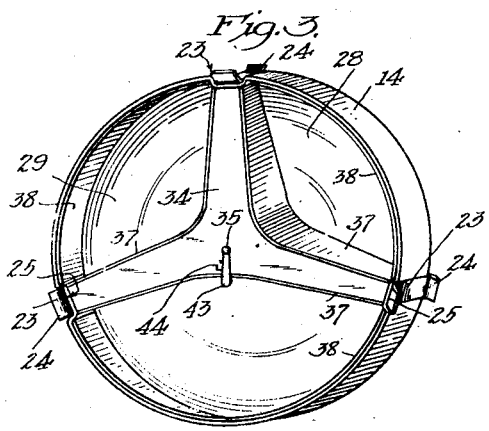
Fig. 3.
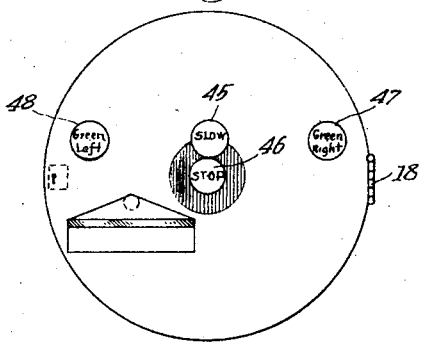
Fig. 5.
Inventor:
Herbert R. Tinker.
By
Atty.

Patented Sept. 11, 1928.

1,684,160

UNITED STATES PATENT OFFICE.

HERBERT R. TINKER, OF LANKERSHIM, CALIFORNIA, ASSIGNOR OF ONE-HALF TO STEPHEN M. WHITE, OF SAN FRANCISCO, CALIFORNIA.

COMBINATION SPARE-TIRE AND ACCESSORY CARRIER.

Application filed April 22, 1924. Serial No. 708,177.

My invention relates generally to vehicle accessories and more particularly to motor vehicle attachments and accessories. The principal object of my invention is to provide a combined spare tire and accessory carrier, with a view to utilizing carrying space not ordinarily used for this purpose, and to provide a carrying arrangement of a simple and compact form and one which will be neat and sightly in appearance. This is arranged to be mounted either upon the side running board or the rear end of the vehicle in the same positions now generally utilized for carrying spare tires.

Included within the scope of this object my improvement provides storage space within the confines of the spare tire rim, which is enclosed, and which may be utilized for carrying either tools or such accessories as auxiliary supplies of oil, fuel and water. The arrangement is in such neat and compact form that the accessory carrying compartments are enclosed within a suitable casing which may be securely locked to prevent their theft.

In the accompanying drawings I have illustrated the preferred specific form of my improvement and reference will be made to them in the following specification.

In these drawings;

Figure 1 is a side elevation of a typical motor vehicle showing how my improvement is mounted upon the running board;

Fig. 2 is an enlarged view of the device showing the cover in open position, parts being shown in section;

Fig. 3 is a perspective view illustrating the general construction of the improvement;

Fig. 4 is a fragmentary transverse vertical section taken as indicated by the line 4—4 of Fig. 3; and Fig. 5 is a view illustrating how signal lights may be mounted upon the cover of the accessory compartments.

While in Figure 1 I have illustrated the manner of mounting my device on the side running board of a motor vehicle it will be readily understood that it may be suitably mounted at the rear end of the vehicle, upon the chassis, in the same location that spare tire carrying frames are now generally mounted.

Referring now to the drawings, the numeral 10 designates generally a typical motor vehicle having a side running board 11 upon which my device—generally designated by the numeral 12—is mounted by means of suitable brackets 13. Brackets 13 may be of any suitable design or configuration which may be necessary to mount the device either on the running board or at the rear end of the vehicle.

The numeral 14 designates a circular band or rim which forms the body portion of the device. This is enclosed at its rear side by a circular closure plate 15 and at its forward or front side by a disc-like door 16. The rear closure plate 15 has an annular inwardly extending flange 17 which is adapted to engage the inner face of the band 14 and be suitably secured thereto as shown in Fig. 4. The cover 16 is suitably hinged to the band 14 as at 18; and may also be provided with a suitable lock 19.

The band 14 may be of any suitable size or diameter, and as this comprises the spare tire carrying support it may be of any size conformable to the particular size of tire rim 20 used upon the vehicle. Rim 20 carrying the spare tire 21 is carried upon the band 14 in the manner illustrated in Fig. 2; brackets 13 being so arranged and secured to the band 14 as to permit the spare tire and rim to be readily slipped onto it from the end enclosed by the door 16.

The band 14 will be of such size relative to the size of the tire rim 20 that the latter can be readily slipped onto it, after which the rim is clamped in position by means of a plurality of radially disposed clamp rods 22. These rods have shoes 23 secured to their outer ends of a length suitable to engage and hold the rim, and for this purpose have upturned ends 24. Shoes 23 are moved into and out of clamping engagement with the rim 21, and to permit the removal of the latter over the upturned ends 24 the band 14 is suitable recessed as at 25.

Clamp rods 22, together with their shoes 23, are normally held inwardly by the action of expansile helical springs 26 surrounding rods 22 and confined between the inner faces of recessed portions 25 and collars 27. Any number of the clamp rods 22 may be provided, but three will ordinarily be sufficient as this number will supply adequate clamping means for the spare tire rim, and when disposed in the manner shown will afford the most convenient storage space within the band 14. In this arrangement of the clamp rods, storage chambers 28, 29 and 30 are provided in which cans 31, 32 and 33 may be placed and securely held in position. These cans may carry oil, water and gasoline or be arranged to carry any other accessories desirable.

The clamping rods 22 are confined between the rear cover plate 15 and a spider 34; the latter providing an internal bracing for the band 14 as well as a bearing for one end of the shaft 35. Shaft 35 is revolubly journaled at its opposite end in a suitable bearing in the rear plate 15 as shown in Fig. 4. Plates 36 extend between the spider 34 and the rear cover plate 15 being rigidly secured to both and forming enclosures for the clamp rods 22 and the actuating mechanism; thereby giving the device a very neat and sightly appearance. Plates 36 are then covered with a soft or yielding material 37 such as rubber or the like, to prevent rattling of the cans or containers 31, 32 and 33. A covering 38 of similar material may also be secured to the inner face of the band 14 for this purpose.

The clamping rods 22 are actuated against the action of springs 26 by means of a lever plate 39 rigidly mounted upon shaft 35 and to the arms 40 of which the inner ends of clamp rods 22 are pivotally connected as at 41. Shaft 35 is held against endwise movement between the rear cover plate 15 and spider 34 by means of collars 42 secured thereon and it is rotated by means of a lever arm 43 secured to its outer end. A stop 44 is secured to the spider 34 against which the lever 43 abuts when the plate 39 is rotated in one direction just past dead center. Thus the action of springs 26 tend to hold the clamp arms in locked position and are unlocked by throwing the lever 43 in the opposite direction.

In Fig. 5 I have illustrated the manner in which tail and signal lights and license plate lights may be conveniently mounted upon the cover 16, so that this will be confined within a defined area and in efficient signaling position. Thus the slow and stop lights 45 and 46, respectively, may be mounted at the center of the cover with right and left green signal lights 47 and 48 mounted on either side thereof. This definitely fixes the positions of the lights indicating right or left hand turns, so that when either is illuminated it can be readily observed in which direction the vehicle is about to turn. Suitable wiring may be carried to these lights from the side of the cover at which it is engaged and properly connected up with the operating end of the vehicle to effect their illumination, when desired.

While I have herein shown and described the preferred specific embodiment of my invention, I nevertheless reserve the right to make such changes or modifications in structure as will come within the scope of the appended claims.

Having described my invention, I claim:

1. In a device of the class described the combination of a band adapted to support a tire rim, radially disposed clamp rods within and extending through said band having shoes on their outer ends to engage the rim and hold it on the band, yielding means to normally hold said shoes out of rim engaging position, and means to move the clamp rods against the action of said yielding means to effect engagement of the shoes with the rim.

2. In a device of the class described the combination of a band adapted to support a tire rim, radially disposed clamp rods within said band and having shoes on their outer ends to engage the rim and hold it on the band, yielding means to normally hold said shoes out of rim engaging position, means to move the clamp rods against the action of said yielding means to effect clamping engagement of the shoes with the rim, a housing around said clamping and actuating means forming storage chambers between it and the band, and storage containers adapted to be carried within said chambers.

3. In a device of the class described the combination of a band adapted to support a tire rim, radially disposed clamp rods within and extending through said band and having shoes on their outer ends adapted to engage the rim and hold it on the band, yielding means to normally hold said shoes out of rim engaging position, means to move the clamp rods against the action of said yielding means to effect clamping engagement of the shoes with the rim, a housing enclosing said clamping and actuating means forming storage chambers between it and the band, storage containers adapted to be removably carried in said chambers, and friction means to hold said containers in said chambers and against rattling.

4. In a device of the class described the combination of a band adapted to support a tire rim, a rear cover plate and front closure plate for said band forming an enclosed storage space therewithin, radially disposed clamp rods within and extending through said band having shoes on their outer ends adapted to engage the rim and hold it on the band, springs to normally hold said shoes out of rim engaging position, means to move the clamp rods against the action of said springs to effect clamping engagement of the shoes with the rim, said means comprising a spider extending across the band adjacent the front closure plate, a shaft revolubly journaled in said spider and the rear cover plate, a lever plate mounted on said shaft having arms pivotally connected to said clamp arms, an actuating lever on the outer end of said shaft, and plates extending between said spider and the rear cover plate forming a housing for the clamping and actuating means, and storage chambers within the band adapted to receive storage containers.

5. In a device of the character described, the combination of a band adapted to support a tire rim, releasable means near the periphery of the band adapted to engage said rim to hold it on the band, plates at opposite sides of the band, actuating means operatively connected to said rim engaging means and disposed between said plates, said actuating means being operable to move said rim engaging means into and out of clamping engagement with the rim, and a housing around said actuating means and defining, with said band and plates, storage chambers.

6. In a device of the class described, the combination of a band adapted to support a tire rim, a rear cover plate and front closure plate for said band forming an enclosed space therewithin, radially disposed clamp rods within and extending through said band having shoes on their outer ends adapted to engage the rim and hold it on the band, springs to normally hold said shoes out of rim engaging position, means to move the clamp rods against the action of said springs to effect clamping engagement of the shoes with the rim, said means comprising a spider extending across the band adjacent the front closure plate, a shaft revolubly journaled in said spider and the rear cover plate, a lever plate mounted on said shaft having arms pivotally connected to said clamp arms, and an actuating lever on the outer end of said shaft.

7. In a device of the character described, a closed hollow storage drum having a door, a plurality of independent rim supports projecting from the periphery thereof, some of said supports having portions adjustable radially to and from rim releasing positions, and mechanism housed wholly within said drum and connected through the periphery of said drum with a plurality of said portions for the simultaneous actuation thereof to and from said positions.

In witness that I claim the foregoing I have hereunto subscribed my name this 7th day of April 1924.

HERBERT R. TINKER.